(12) United States Patent
Li et al.

(10) Patent No.: US 9,663,022 B2
(45) Date of Patent: May 30, 2017

(54) INTELLIGENT CONTROL METHOD AND SYSTEM FOR AUTOMOBILE HEADLIGHTS

(71) Applicant: ZHENGZHOU YUTONG BUS CO., LTD., Zhengzhou (CN)

(72) Inventors: Fei Li, Henan (CN); Lei Zhang, Henan (CN); Huixian Li, Henan (CN)

(73) Assignee: ZHENGZHOU YUTONG BUS CO., LTD., Zhengshou (CN)

( * ) Notice: Subject to any disclaimer, the term of this patent is extended or adjusted under 35 U.S.C. 154(b) by 1 day.

(21) Appl. No.: 14/713,429

(22) Filed: May 15, 2015

(65) Prior Publication Data

US 2016/0016503 A1    Jan. 21, 2016

Related U.S. Application Data

(63) Continuation-in-part of application No. PCT/CN2013/001388, filed on Nov. 16, 2013.

(30) Foreign Application Priority Data

Nov. 16, 2012  (CN) .......................... 2012 1 0466912

(51) Int. Cl.
*B60Q 1/02* (2006.01)
*B60Q 1/08* (2006.01)
(Continued)

(52) U.S. Cl.
CPC ............... *B60Q 1/08* (2013.01); *B60Q 1/143* (2013.01); *B60Q 11/005* (2013.01);
(Continued)

(58) Field of Classification Search
CPC .......................... B60Q 1/1423; B60Q 2300/314
(Continued)

(56) References Cited

U.S. PATENT DOCUMENTS

| 6,049,171 A * | 4/2000 | Stam | B60Q 1/085 |
| | | | 250/208.1 |
| 6,343,869 B1 | 2/2002 | Kobayashi | |
| 6,906,467 B2 * | 6/2005 | Stam | B60Q 1/085 |
| | | | 250/208.1 |
| 7,653,215 B2 * | 1/2010 | Stam | B60Q 1/085 |
| | | | 348/118 |

(Continued)

FOREIGN PATENT DOCUMENTS

| CN | 2540333 Y | 3/2003 |
| CN | 202528900 U | 11/2012 |

(Continued)

OTHER PUBLICATIONS

International Search Report for PCT/CN2013/001388 mailed Jan. 30, 2014.

*Primary Examiner* — Thuy Vinh Tran
(74) *Attorney, Agent, or Firm* — Drinker Biddle & Reath LLP (57) ABSTRACT

Disclosed are an intelligent control method and system for automobile headlights, which is used for improving traveling safety and comfort, and meanwhile solving the problem that monitoring the control result is not provided by existing automobile control systems. The intelligent control system for automobile headlights can control turning on and off of the automobile headlights automatically according to the changes of ambient light intensity, and switching between high/low beam lights can be automatically realized when automobiles meet at night, and meanwhile a self-diagnostic function is provided. Whether the control system for automobile headlights operates in an automatic mode or a manual mode, the operating status of the headlights can be monitored by the self-diagnostic function of the system and a fault point can be located accurately, which is output by means of a fault display lamp or a fault code. It is convenient for maintenance personnel to repair or monitor the illumination condition of an automobile on the basis of the automobile operational system of the automobile network, (Continued)

and for a driver or relevant service staffs to know the operating status of automobile headlights in real time.

17 Claims, 6 Drawing Sheets (51) Int. Cl.
 *B60Q 1/14* (2006.01)
 *B60Q 11/00* (2006.01)
(52) U.S. Cl.
 CPC .. *B60Q 2300/314* (2013.01); *B60Q 2300/337* (2013.01); *B60Q 2300/42* (2013.01)
(58) Field of Classification Search
 USPC .......................................................... 315/82
 See application file for complete search history.

(56) References Cited

U.S. PATENT DOCUMENTS

| 2003/0123705 | A1* | 7/2003 | Stam | B60Q 1/085 |
| | | | | 382/104 |
| 2006/0041417 | A1* | 2/2006 | Palladino | G06F 11/261 |
| | | | | 703/14 |
| 2007/0253597 | A1* | 11/2007 | Utida | B60Q 1/085 |
| | | | | 382/104 |
| 2008/0158360 | A1 | 7/2008 | Katou et al. | |

FOREIGN PATENT DOCUMENTS

| CN | 102951069 A | 3/2013 |
| DE | 102010048100 A1 | 4/2012 |
| EP | 2116421 A2 | 11/2009 |
| JP | 2002172975 A | 6/2002 |
| JP | 2005138781 A | 6/2005 |

* cited by examiner

INTELLIGENT CONTROL METHOD AND SYSTEM FOR AUTOMOBILE HEADLIGHTS

CROSS-REFERENCE TO RELATED APPLICATIONS

This application is a continuation-in-part of PCT/CN2013/001388, filed Nov. 16, 2013, which claims benefit of Chinese Application No. 201210466912.9, filed Nov. 16, 2012, both of which are incorporated herein by reference in their entirety.

TECHNICAL FIELD

The present invention provides an intelligent control method and system for automobile headlights.

BACKGROUND ART

At present, operational modes for automobile headlights are mostly manual control. Automatic control systems for headlights have been provided in high-end automobile types by relevant passenger automobile manufacturers; however, the cost is relatively high and the functions are comparatively simple for the most part. Most systems can only control turning on and off of the headlights, and switching between high/low beam lights, but execution results of headlights controlling are not monitored. Along with the popularization and application of automobile network systems, the operating status of each critical component of an automobile is incorporated into monitoring of an automobile operational system, and therefore, it may also be a future development trend of automobile electrical systems to monitor the operating status of automobile headlights.

SUMMARY OF THE INVENTION

A purpose of the present invention is to provide an intelligent control method and system for automobile headlights, which is used for improving traveling safety and comfort.

In order to achieve the above purpose, a scheme of a method of the present invention is: the intelligent control method for automobile headlights and the steps comprise: setting the parameters: setting $U_{OJ}$ as the ambient light intensity threshold of the low beam lights turning on, $U_{OY}$ as the ambient light intensity threshold of the high beam lights turning on, $K_s$ as the ambient light intensity descendant rate threshold of automobiles entering a tunnel and traveling, $K_H$ as the ambient light intensity ascendant rate threshold of automobiles meeting beginning; the current light intensity is detected at an interval of time in the automatic control mode, and turning on or off of the high beam lights and low beam lights are controlled according to the turning on status or turning off status of high beam lights and low beam lights, the current light intensity, and the descendant/ascendant rate of light intensity.

The intelligent control system for automobile headlights of can control turning on and off of the automobile headlights automatically according to the changes of ambient light intensity, and can achieve switching between high/low beam lights automatically when automobiles meet at night.

A scheme of a system of the present invention is: the intelligent control system for automobile headlights comprise a main controller, the input of the main controller is connected to a signal acquisition circuit and the output thereof is connected to a drive output circuit, the signal acquisition circuit comprises a panel switching signal acquisition circuit and an ambient light intensity signal acquisition circuit, the drive output circuit comprises a control and drive circuit for low beam lights and high beam lights.

Furthermore, the signal acquisition circuit is provided with a fault feed-back signal acquisition circuit, and the drive output circuit is provided with a fault signal output circuit. Through the fault feed-back signal acquisition circuit and fault signal output circuit, the control system is also having a self-diagnostic function. Whether the control system for automobile headlights operates in an automatic mode or a manual mode, the operating status of the headlights can be monitored by the self-diagnostic function of the system, and a fault point can be located accurately, which is output by means of a fault display lamp or a fault code. It is convenient for maintenance personnel to repair or monitor the illumination condition of an automobile on the basis of the automobile operational system of the automobile network, and for a driver or relevant service staffs to know the operating status of automobile headlights in real time.

The system is not high in cost, but good in versatility, and suitable to be popularized in various passenger automobiles and coaches. The system can be adapted in various complicated environmental conditions such as tunnel traveling, night traveling/meeting, etc., and can be safely and reliably operated.

DETAILED DESCRIPTION OF THE EMBODIMENTS

The present disclosure is illustrated in further detail in combination with the drawings as follows.

The Embodiment of the System

In the text, labeled numerals and numeral subscripts are not distinguished. For example, I1 and $I_1$ both represent the level at I1 node in FIG. 2 and FIG. 3. Similarly, I2 and $I_2$, I3 and $I_3$ ... K1, K2 and K3 refer to changing rate of light intensity or relay, according to the concrete context.

Figure 1:
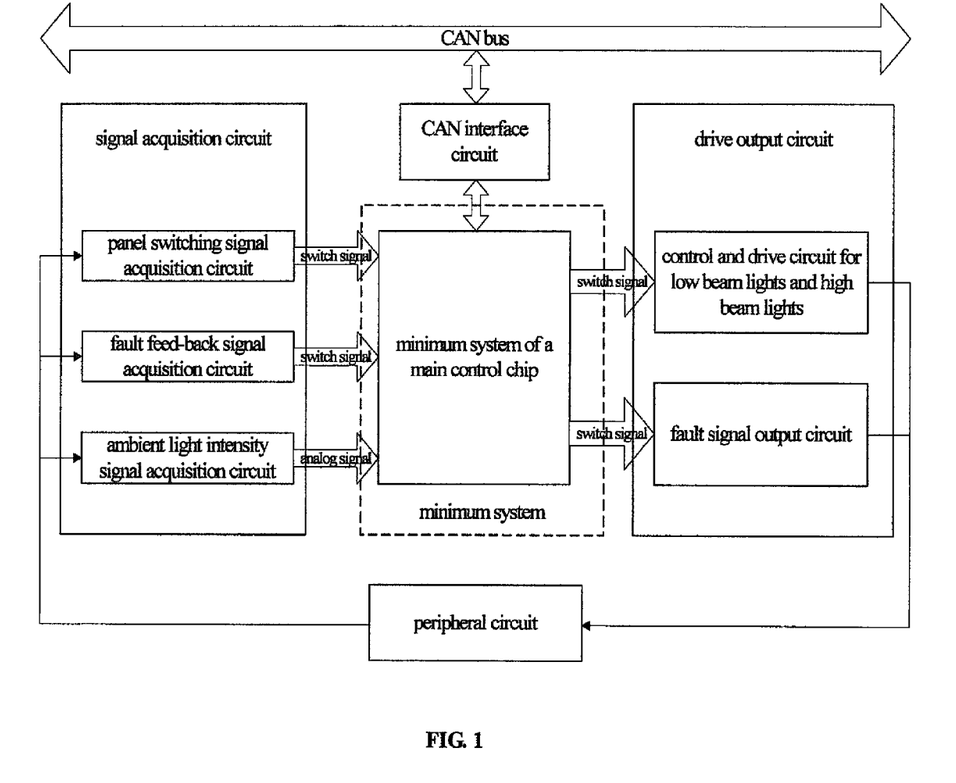
FIG. 1 is a block diagram of a circuit of the present disclosure.

An intelligent control system for automobile headlights as shown in FIG. 1 comprises the main controller (a minimum system of a main control chip in FIG. 1). The input of the main controller is connected to the signal acquisition circuit and the output thereof is connected to the drive output circuit. The signal acquisition circuit comprises the panel switching signal acquisition circuit, the ambient light intensity signal acquisition circuit, the fault feed-back signal acquisition circuit. The drive output circuit comprises the control and drive circuit for low beam lights and high beam lights, and the fault signal output circuit. The main controller is communicatively connected with a CAN bus in the automobile through a CAN interface circuit and receives the information from the CAN bus.

Each circuit module will be introduced in details as below, respectively. The main controller, i.e., the minimum system of the main control chip, shown in FIG. 2, comprises a main control chip, a power supply circuit, a clock circuit, a reset circuit and an interface circuit for downloading a program. The main control chip is an MCU, and seven IO channels of input, six IO channels of output and one channel of AD conversion can be achieved. $C_{10}$ is a decoupling capacitor for the power supply of the MCU. The power supply circuit is composed of an anti-reverse diode $D_1$, a transient-suppression diode $D_2$, polarity capacitors $C_1$, $C_2$, $C_3$, non-polarity capacitors $C_4$, $C_5$, $C_6$, a high precision DC24V/24V isolated power supply module, and a high precision DC24V/5V power supply module. The main function of the power supply circuit is to supply stable operating voltage for the main control chip and other operating circuits. The clock circuit is composed of non-polarity capacitors $C_{11}$, $C_{12}$, a crystal oscillator $Y_1$ and a resistor $R_6$. The reset circuit is composed of a reset chip $U_6$, resistors $R_7$, $R_8$ and a reset button $S_1$, and a reset signal is generated when the reset button $S_1$ is pressed down with manual operation or the voltage provided by the power supply is too low. The interface circuit for downloading a program is implemented by a Freescale standard BDM interface.

Figure 2:
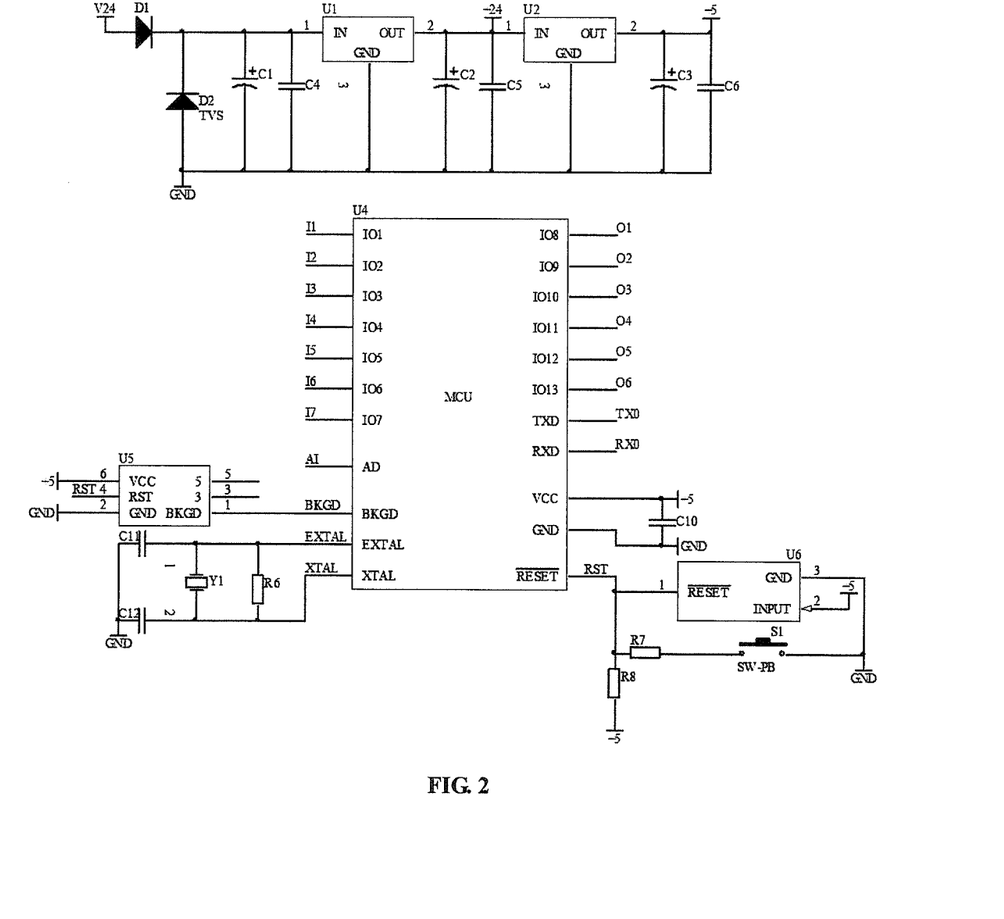
FIG. 2 is a schematic diagram of a main controller circuit of the present disclosure.
Figure 3:
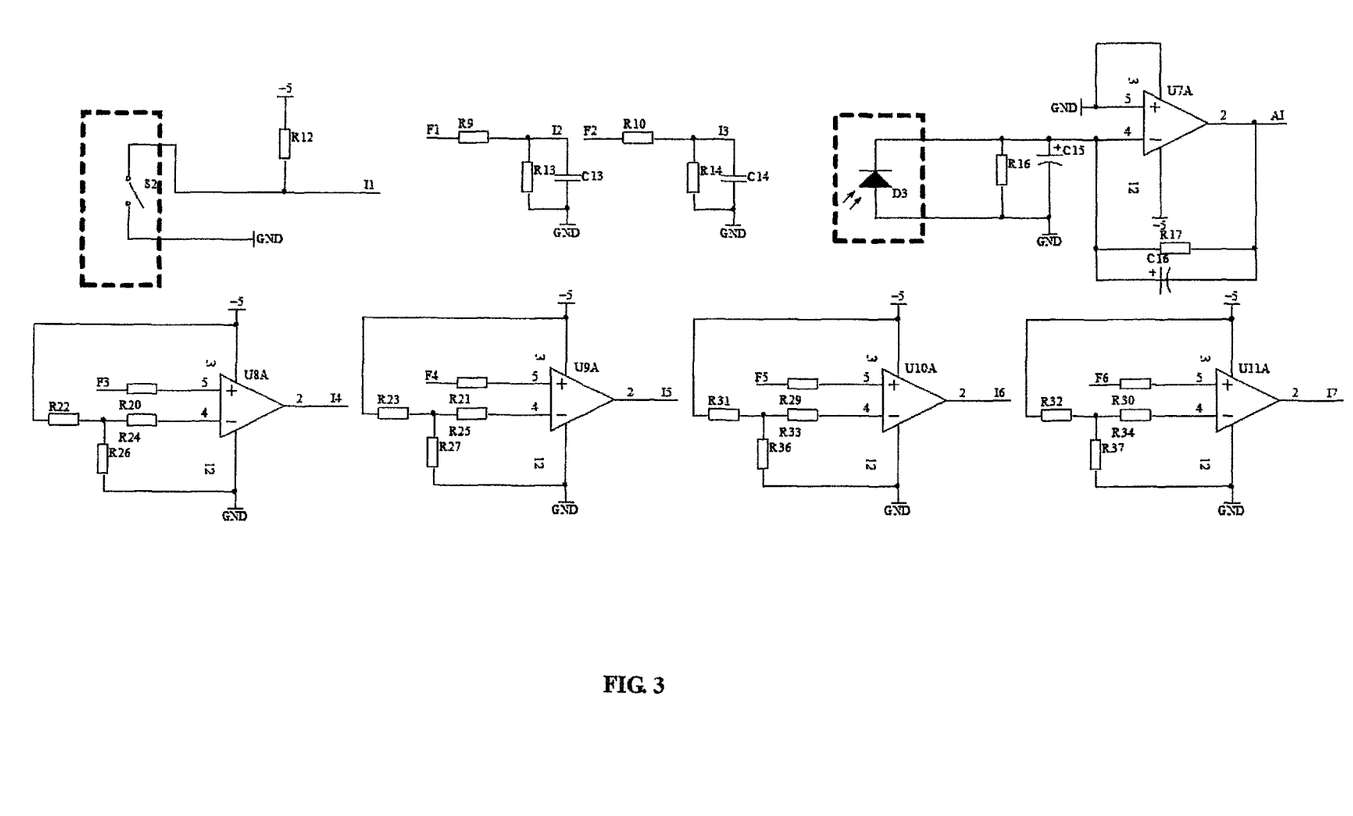
FIG. 3 is a schematic diagram of signal acquisition circuits for the main controller circuit of FIG. 2.
Figure 4:
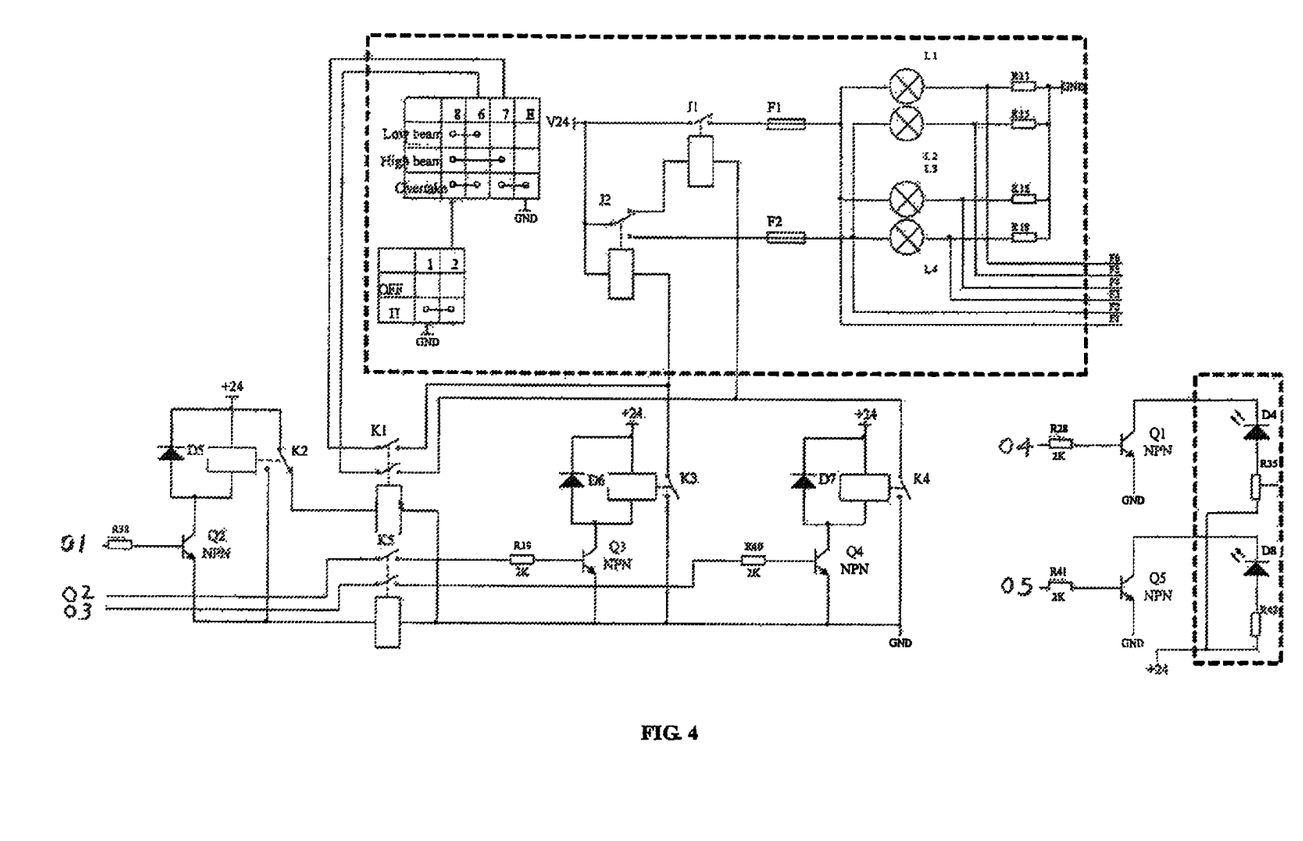
FIG. 4 is a schematic diagram of drive output circuits for the main controller circuit of FIG. 2.

The signal acquisition circuit shown in FIG. 3 (the same marks in FIG. 2, FIG. 3 and FIG. 4 represent the same nodes) comprises the panel switching signal acquisition circuit, fault feed-back signal acquisition circuit and ambient light intensity signal acquisition circuit.

The panel switching signal acquisition circuit contains a resistor $R_{12}$, and the main function is to collect the switch signal of the manual/automatic changeover switch S2 on an instrument desk and to judge whether the manual signal is valid or the automatic signal is valid. The ambient light intensity signal acquisition circuit comprises an operational amplifier U7A, resistors $R_{16}$, $R_{17}$ and polarity capacitors $C_{15}$, $C_{16}$. A voltage signal is finally output through amplification of the current in an ambient light intensity sensor (the photosensitive diode D3) to reflect the magnitude of the ambient light intensity.

The fault feed-back signal acquisition circuit comprises two parts: one part is a filter circuit used for detecting whether voltage signals exist on the positive ends of the high beam lights and low beam lights. The corresponding input ports I2, I3, of the main controller are connected to the positive ends F1, F2 of the high beam lights and low beam lights, respectively through the filter circuit which is a voltage division filter circuit constituted by resistors and capacitors (R9, R10, R13, R14, C13, C14) respectively. The other part is a voltage comparison circuit used for detecting whether current signals exist in the circuits of the high beam lights and low beam lights. The main controller is connected to the negative ends F3, F4, F5, F6 of the low beam lights and high beam lights through the corresponding input ports I4, I5, I6, I7, respectively, as shown in FIG. 4.

The fault signal output circuit is a fault signal output circuit using a light-emitting diode, which is composed of a switching tube controlled by the main controller and a light-emitting diode connected in serial with the switching tube. As shown in FIG. 4, the fault signal output circuit mainly comprises resistors $R_{28}$, $R_{41}$ and NPN transistors $Q_1$, $Q_5$. The turning on and off of a fault lamp (the light-emitting diodes $D_4$, $D_8$) is controlled by the on-offs of the NPN transistors, which are controlled by the fault signals $O_4$, $O_5$ output by the main control chip.

Four indication lamps L1, L2, L3, L4, which are grouped as a right low beam light L1, a right high beam light L2, a left low beam light L3, and a left high beam light L4, are driven and controlled by the control and drive circuit for the low beam lights and high beam lights. The positive ends of the right low beam light L1 and the left low beam light L3 are short connected, and the positive ends of the right high beam light L2 and the left high beam light L4 are short connected.

The positive ends of L1 and L3 are connected to the driving power supply (V24) through a first contactor J1 after being short connected, the positive ends of L2 and L4 are connected to the driving power supply through normally open contacts of a second contactor J2 after being short connected, and the coil of the first contactor J1 is connected to the driving power supply through the normally closed contacts of the second contactor J2. The coils of the first contactor J1 and the second contactor J2 are connected to a combination switch and a rocker switch (the combination switch and the rocker switch being connected to the ground, the combination switch being used for manual beam modulating, and the rocker switch being a master switch of the lights) through a manual relay K1. The coils of the first contactor J1 and the second contactor J2 are connected to the corresponding ground control circuits that are controlled by the main controller, respectively. The ground control circuits are referred to, as shown in FIG. 4, the loop formed by connecting the coils of J1 and J2 to the ground through the ground relays K3, K4. Transistors Q3, Q4 controlled by the main controller are provided in a serial connection in the coil power supply loop of the ground relays K3, K4; Q3 and Q4 are corresponding to the output ports O3 and O2 of the main controller, respectively. An automatic relay K5 is also provided in a serial connection in the coil power supply loop of the ground relays K3 and K4. The first gear on the right of K2 is a manual shift gear, and the first gear on the left is an automatic shift gear. K1 is powered and closed when K2 is switched to the manual shift gear. A loop is formed by the coil circuit of J1 through the combination switch. The condition for illuminating L1 and L3 is that J1 is closed and J2 is open (i.e., the position where the switch J2 is located in FIG. 4 and a coil loop of J1 can be connected); the condition for illuminating L2 and L4 is that J2 is closed (which is different from the position of J2 in FIG. 4 and the circuits of L2 and L4 are connected), thus the control loop of J1 is open at this time, and J1 cannot be closed. When K2 is switched to the automatic shift gear, the automatic relay K5 is powered and closed, and the output control of O3 and O2 are valid. The condition for illuminating L1 and 13 is that J1 is closed, J2 is open, K4 is closed, and O2 is at a high level. The condition for illuminating L2 and L4 is that J2 is closed, K3 is closed, and O3 is at a high level.

As shown in FIG. 4, the control and drive circuit for the low beam lights and high beam lights comprises relays K1, K2, K3, K4, K5, diodes $D_5$, $D_6$, $D_7$, resistors $R_{38}$, $R_{39}$, $R_{40}$ and NPN transistors $Q_2$, $Q_3$, $Q_4$. Functions are achieved by the on and offs of the relays that are controlled by the signals $O_1$, $O_2$, $O_3$ output by the main control chip, such as the switching between manual control and automatic control for the low beam lights and the high beam lights, turning on and off of the low beam lights and the high beam lights, and the automatic switching between the low beam lights and the high beam lights.

The circuits in the above embodiment: the ambient light intensity acquisition circuit, the control and drive circuit for low beam lights and high beam lights, the fault feed-back signal acquisition circuit and the fault signal output circuit are mainly used for collecting the ambient light intensity signals, controlling and driving for low beam lights and high beam lights, collecting the fault feed-back signals and outputting the fault signals.

In other embodiments, other specific circuits in the prior art that can achieve the above corresponding functions may be adopted to substitute the circuits in the above embodiment.

In other embodiments, if the controlling results are not monitored, i.e., the fault feed-back and the fault signal output are not implemented, the above fault feed-back signal acquisition circuit and fault signal output circuit can be omitted. What's more, if switching between the manual mode and automatic mode is not needed, the above panel switching signal acquisition circuit is also can be omitted.

The Embodiment of the Method

A core idea of a control method of the present invention is: setting $U_{OJ}$ as the ambient light intensity threshold of the low beam lights turning on, $U_{OY}$ as the ambient light intensity threshold of the high beam lights turning on, $K_s$ as the ambient light intensity descendant rate threshold of automobiles entering a tunnel and traveling, $K_H$ as the ambient light intensity ascendant rate threshold of automobiles meeting beginning; the current light intensity is detected at an interval of time in the automatic control mode, and turning on or off of the high beam lights and low beam lights are controlled according to the turning on status or turning off status of high beam lights and low beam lights, the current light intensity, and the descendant/ascendant rate of light intensity.

A specific control mode is as follows:

(A), setting the parameters: setting $U_{OJ}$ as the ambient light intensity threshold of the low beam lights turning on, $U_{OY}$ as the ambient light intensity threshold of the high beam lights turning on, $K_s$ as the ambient light intensity descendant rate threshold of automobiles entering a tunnel and traveling, $K_H$ as the ambient light intensity ascendant rate threshold of automobiles meeting beginning;

(B), judging whether it is in an automatic control mode: if not, manual operations are performed;

(C), both the high beam lights and low beam lights are off in the automatic control mode and the current light intensity is detected at an interval of time $\Delta t1$. If the current light intensity is less than $U_{OJ}$, the first light intensity descendant rate K1 is calculated. If K1<Ks, enter the night traveling mode; if K1>Ks, enter the tunnel traveling mode. The low beam lights are all on in the night traveling mode and the tunnel traveling mode;

(D), the current light intensity is detected at an interval of time $\Delta t2$ under the condition that the low beam lights are on. If the current light intensity does not become higher, judge whether the current light intensity is less than $U_{OY}$. If it is, the low beam lights are turned off and the high beam lights are turned on; if it is not, the low beam lights are maintained in the turning on status;

If the current light intensity becomes higher, the second light intensity ascendant rate K2 is calculated and then judge whether it is in the tunnel traveling mode. If it is not in the tunnel traveling mode, and if the current light intensity is not larger than $U_{OJ}$, or the current light intensity is larger than $U_{OJ}$ and K2>$K_H$, the low beam lights are maintained in a turning on status; if it is not in the tunnel traveling mode, and if the current light intensity is larger than $U_{OJ}$, and K2 is not larger than $K_H$, the low beam lights are turned off;

If it is in the tunnel traveling mode, the current light intensity is detected again. If the current light intensity becomes lower, or the current light intensity does not become lower and the current light intensity is not larger than $U_{OJ}$, the low beam lights are maintained in the turning on status. If the current light intensity does not become lower and the current light intensity is larger than $U_{OJ}$, the low beam lights are turned off;

(E), the current light intensity is detected at an interval of time $\Delta t3$ under the condition that the high beam lights are on. If the current light intensity becomes higher and the third light intensity ascendant rate K3 is larger than $K_H$, automobiles begin to meet; or if the current light intensity becomes higher and the light intensity ascendant rate K3 is not larger than $K_H$ and the current light intensity is larger than $U_{OY}$, the high beam lights are turned off and the low beam lights are turned on; if the current light intensity does not become higher, or the current light intensity becomes higher and the third light intensity ascendant rate K3 is not larger than $K_H$ and the current light intensity is not larger than $U_{OY}$, the high beam lights are maintained in a turning on status.

Figure 5:
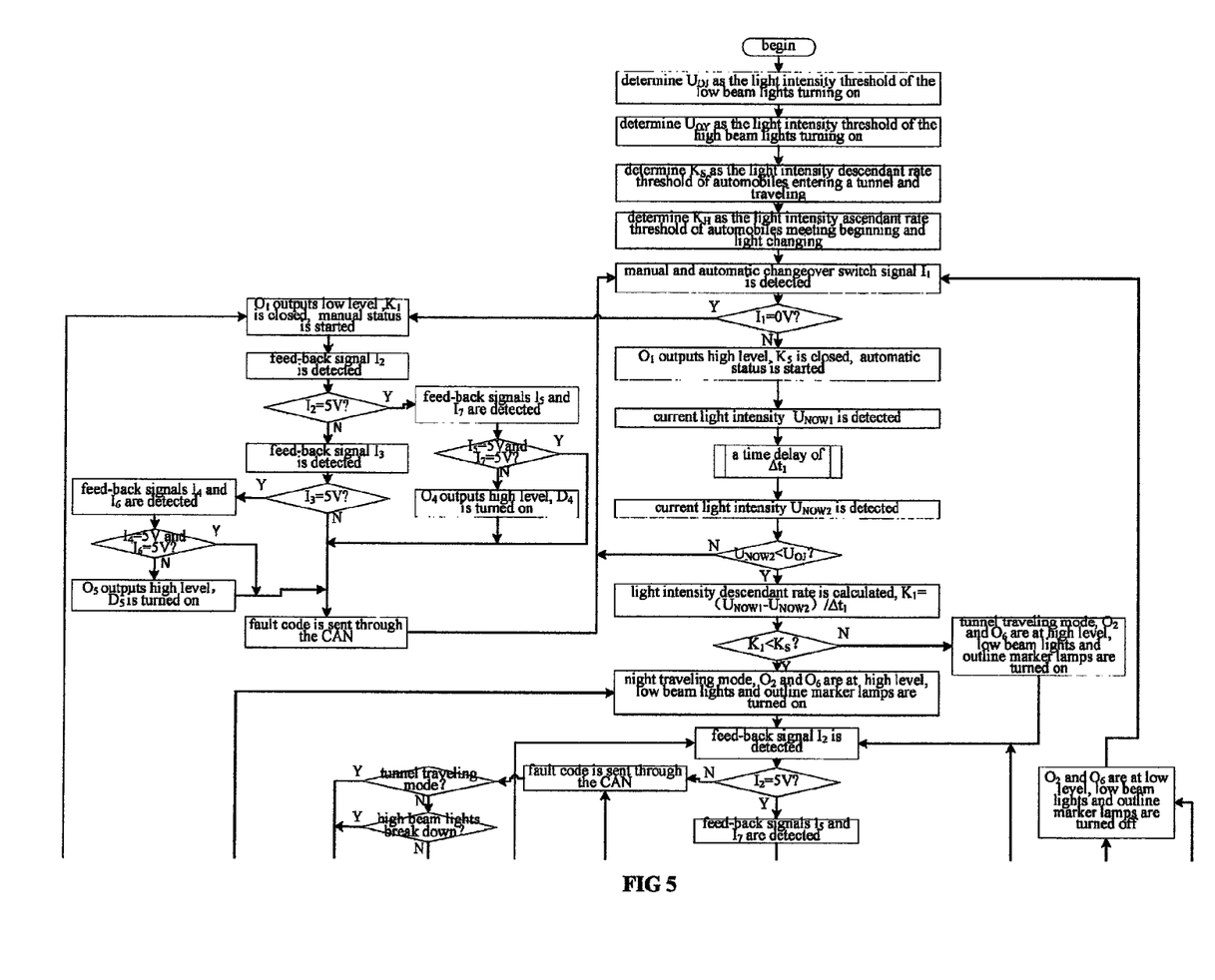
FIG. 5 is a flow chart of a program.

As shown in FIG. 5, the detailed process is as follows:

(1) Determining the $U_{OJ}$ as ambient light intensity threshold of the low beam lights turning on, the $U_{OY}$ as ambient light intensity threshold of the high beam lights turning on, the $K_s$ as ambient light intensity descendant rate threshold of automobiles entering a tunnel and traveling and the $K_H$ as ambient light intensity ascendant rate threshold of automobiles meeting beginning, respectively;

(2) A manual and automatic changeover switch signal $I_1$ is detected by the main control chip through $IO_1$. If $I_1$ is at low level, the step (3) is performed, and if $I_1$ is at high level, the step (11) is performed;

(3) A low level signal $O_1$ is output by $IO_8$, which is controlled by the main control chip. The manual relay $K_1$ is powered and closed at this time, and the control system is in a manual status;

(4) A signal $I_2$ is detected by the main control chip through $IO_2$. If $I_2$ is at high level, the step (5) is performed, and if $I_2$ is at low level, the step (7) is performed;

(5) Feed-back signals $I_5$ and $I_7$ are detected by the main control chip through $IO_5$ and $IO_7$, respectively. If $I_5$ and $I_7$ are not both at high level, the step (6) is performed; and if $I_5$ and $I_7$ are both at high level, the step (10) is performed;

(6) A high level $O_4$ is output by $IO_{11}$, which is controlled by the main control chip. The fault lamp D4 is turned on, and the step (10) is performed;

(7) A signal $I_3$ is detected by the main control chip through $IO_3$. If $I_3$ is at high level, the step (8) is performed, and if $I_3$ is at low level, the step (10) is performed;

(8) Feed-back signals $I_4$ and $I_6$ are detected by the main control chip through $IO_4$ and $IO_6$, respectively. If $I_4$ and $I_6$ are not both at high level, the step (9) is performed; and if $I_4$ and $I_6$ are both at high level, the step (10) is performed;

(9) A high level $O_5$ is output by $IO_{12}$, which is controlled by the main control chip. The fault lamp D5 is turned on;

(10) A fault code is sent through the CAN bus, and the programme is returned to perform the step (2);

(11) A high level signal $O_1$ is output by $IO_8$, which is controlled by the main control chip. The automatic relay KS is powered and closed at this time, and the control system is in an automatic status;

(12) An ambient light intensity signal $U_{NOW1}$ is detected by the main control chip through AD;

(13) A delay sub-programme is called for a time delay of $\Delta t_1$;

(14) An ambient light intensity signal $U_{NOW2}$ is detected again;

(15) The $U_{NOW2}$ and $U_{OJ}$ are compared. If $U_{NOW2}$ is not smaller than $U_{OJ}$, the programme is returned to perform the step (2). If $U_{NOW2}$ is smaller than $U_{OJ}$, the step (16) is performed;

(16) The light intensity descendant rate is calculated on the basis of $U_{NOW1}$, $U_{NOW2}$ and $\Delta t_1$, which is $$K_1 = \frac{U_{NOW1} - U_{NOW2}}{\Delta t_1};$$

(17) The $K_1$ and $K_s$ are compared. If $K_1$ is smaller than $K_s$, the step (18) is performed. If $K_1$ is not smaller than $K_s$, the step (19) is performed;

(18) The night traveling mode is entered. High level $O_2$ and high level $O_6$ are output by the main control chip through $IO_9$ and $IO_{13}$. The low beam lights and outline marker lamps are turned on and the step (20) is performed;

(19) The tunnel traveling mode is entered. High level $O_2$ and high level $O_6$ are output by the main control chip through $IO_9$ and $IO_{13}$. The low beam lights and outline marker lamps are turned on;

(20) The signal $I_2$ is detected by the main control chip through $IO_2$. If $I_2$ is at high level, the step (21) is performed, and if $I_2$ is at low level, the step (23) is performed;

(21) Feed-back signals $I_5$ and $I_7$ are detected by the main control chip through $IO_5$ and $IO_7$, respectively. If $I_5$ and $I_7$ are not both at high level, the step (22) is performed; and if $I_5$ and $I_7$ are both at high level, the step (26) is performed;

(22) A high level $O_4$ is output by $IO_{11}$, which is controlled by the main control chip, and the fault lamp $D_4$ is turned on;

(23) A fault code is sent through the CAN bus;

(24) Whether it is now in the tunnel traveling mode is judged. If it is not, the step (25) is performed; and if it is, the step (57) is performed;

(25) Whether the high beam lights break down is judged. If they do not break down, the step (42) is performed; and if they break down, the step (57) is performed;

(26) An ambient light intensity signal $U_{NOW3}$ is detected by the main control chip through AD;

(27) A delay sub-programme is called for a time delay of $\Delta t_2$;

(28) An ambient light intensity signal $U_{NOW4}$ is detected again;

(29) The $U_{NOW4}$ and $U_{NOW3}$ are compared. If $U_{NOW4}$ is larger than $U_{NOW3}$, the step (30) is performed. If $U_{NOW4}$ is not larger than $U_{NOW3}$, the step (39) is performed;

(30) The light intensity ascendant rate is calculated on the basis of $U_{NOW4}$, $U_{NOW3}$ and $\Delta t_2$, which is $$K_2 = \frac{U_{NOW4} - U_{NOW3}}{\Delta t_2};$$

(31) Whether it is now in the tunnel traveling mode is judged. If it is, the step (32) is performed; if it is not, the step (37) is performed;

(32) A delay sub-program is called for a time delay of $\Delta t_4$;

(33) An ambient light intensity signal $U_{NOW7}$ is detected by the main control chip through AD;

(34) The $U_{NOW7}$ and $U_{NOW4}$ are compared. If $U_{NOW7}$ is not smaller than $U_{NOW4}$, the step (35) is performed. If $U_{NOW7}$ is smaller than $U_{NOW4}$, the step (20) is performed;

(35) The $U_{NOW7}$ and $U_{OJ}$ are compared. If $U_{NOW7}$ is larger than $U_{OJ}$, the step (36) is performed. If $U_{NOW7}$ is not larger than $U_{OJ}$, the step (20) is performed;

(36) Low level $O_2$ and low level $O_6$ are output by the main control chip through $IO_9$ and $IO_{13}$. Both the low beam lights and outline marker lamps are turned off and the programme is returned to perform the step (2);

(37) The $U_{NOW4}$ and $U_{OJ}$ are compared. If $U_{NOW4}$ is larger than $U_{OJ}$, the step (38) is performed. If $U_{NOW4}$ is not larger than $U_{OJ}$, the step (40) is performed;

(38) The $K_2$ and $K_H$ are compared. If $K_2$ is not larger than $K_H$, the step (36) is performed, and if $K_2$ is larger than $K_H$, the step (40) is performed;

(39) The $U_{NOW4}$ and $U_{OY}$ are compared. If $U_{NOW4}$ is not smaller than $U_{OY}$, the step (40) is performed. If $U_{NOW4}$ is smaller than $U_{OY}$, the step (42) is performed;

(40) The manual and automatic changeover switch signal $I_1$ is detected by the main control chip through $IO_1$. If $I_1$ is at low level, the step (41) is performed, and if $I_1$ is at high level, the step (20) is performed;

(41) Low level signals $O_2$, $O_3$ and $O_6$ are output by the main control chip through $IO_9$, $IO_{10}$ and $IO_{13}$. The low beam lights, the high beam lights and the outline marker lamps are all turned off, and the programme is returned to perform the step (3);

(42) A low level signal $O_2$ is output by the main control chip through $IO_9$, and a high level signal $O_3$ is output through $IO_{10}$. The low beam lights are turned off and the high beam lights are turned on at this time;

(43) A feed-back signal $I_3$ is detected by the main control chip through $IO_3$. If $I_3$ is at high level, the step (44) is performed; and if $I_3$ is at low level, the step (46) is performed;

(44) Feed-back signals $I_4$ and $I_6$ are detected by the main control chip through $IO_4$ and $IO_6$. If $I_4$ and $I_6$ are not both at high level, the step (45) is performed; if $I_4$ and $I_6$ are both at high level, the step (48) is performed;

(45) A high level $O_5$ is output by the main control chip through $IO_{12}$. The fault lamp $D_5$ is turned on at this time;

(46) A fault code is sent through the CAN bus;

(47) Whether the low beam lights break down is judged. If they do not break down, the step (56) is performed; and if they break down, the step (57) is performed;

(48) An ambient light intensity signal $U_{NOW5}$ is detected by the main control chip through AD;

(49) A delay sub-programme is called for a time delay of $\Delta t_3$;

(50) An ambient light intensity signal $U_{NOW6}$ is detected again;

(51) The $U_{NOW6}$ and $U_{NOW5}$ are compared. If $U_{NOW6}$ is larger than $U_{NOW5}$, the step (52) is performed. If $U_{NOW6}$ is not larger than $U_{NOW5}$, the step (55) is performed;

(52) The light intensity ascendant rate is calculated on the basis of $U_{NOW6}$, $U_{NOW5}$ and $\Delta t_3$, which is $$K_3 = \frac{U_{NOW6} - U_{NOW5}}{\Delta t_3};$$

(53) The $K_3$ and $K_H$ are compared. If $K_3$ is not larger than $K_H$, the step (54) is performed, and if $K_3$ is larger than $K_H$, the step (56) is performed;

(54) The $U_{NOW6}$ and $U_{OY}$ are compared. If $U_{NOW6}$ is not larger than $U_{OY}$, the step (55) is performed. If $U_{NOW6}$ is larger than $U_{OY}$, the step (56) is performed;

(55) The manual and automatic changeover switch signal $I_1$ is detected by the main control chip through $IO_1$. If $I_1$ is at low level, the step (41) is performed, and if $I_1$ is at high level, the step (43) is performed;

(56) A low level $O_3$ is output by the main control chip through $IO_{10}$. The high beam lights are turned off and the programme is returned to perform the step (18);

(57) Low level $O_1$, low level $O_2$, low level $O_3$ and low level $O_6$ are output by the main control chip through $IO_8$, $IO_9$, $IO_{10}$ and $IO_{13}$, respectively. The low beam lights, high beam lights and the outline marker lamps are all turned off, and the control system is forced to switch to the manual status;

(58) The programme ends.

In the above embodiment, the method is mainly consisted of three independent statuses: both the high beam lights and the low beam lights are off, the low beam lights are on and the high beam lights are on; the three independent statuses can switch according to the ambient light intensity.

It must be noted that the three independent statuses exist at the same time (as shown in FIG. 5) in the programme. In practice, any one of the three independent statuses may exist independently, or two of them may be combined with each other in other embodiments. Besides, an orderly mode is adopted in the flowchart of the programme as shown in FIG. 5; in other embodiments, an interrupt mode may also be adopted to set the programme, and each status is set into the interrupt processing programme, or the programme is also set on the specific control system (i.e. µ cos real-time system).

Besides, when controlling the low beam lights and high beam lights, monitoring the control results is achieved by adopting the method in the above embodiment: firstly, send the control order, and then collect the corresponding fault feed-back signals; if the problem arises, send the fault signal code. For example, as shown in FIG. 5, when controlling the turning on of the high beam lights, feed-back signal I3 is detected, and judging whether I3 is 5V or not. As in combination with FIG. 3 and FIGS. 4, I3 and F2 are equipotential, F2 is the positive end of high beam light, and when controlling the turning on of high beam lights, F2 should be at high level (5V); if I3 is at high level, it can determine that controlling of the high beam lights is normal; if I3 is not at high level, which shows the fault exists and the fault code is sent.

In other embodiments, the above method of monitoring the controlling results may not be adopted, or other methods of monitoring the control results may be adopted.

Advantageous effects of the present disclosure are as follows:

When the system is in the automatic status and the driving environment changes, the status of the automobile headlights can be automatically adjusted in time, such as the automatic turning on and off of the automobile headlights, automatic switching between low beam lights and high beam lights, etc. No manual operations are needed for drivers, labor intensity of the drivers is greatly reduced, and traveling safety and comfort can be improved.

Whether the control system for automobile headlights operates in an automatic mode or a manual mode, the operating status of the headlights can be monitored by the self-diagnostic function of the system and a fault point can be located accurately, which is output by means of a fault display lamp or a fault code. It is convenient for maintenance personnel to repair or monitor the illumination condition of an automobile on the basis of the automobile operational system of the automobile network, and for a driver or relevant service staff to know the operating status of automobile headlights in real time.

The system makes few changes to electrical circuits of an automobile itself, which helps mounting conveniently on various passenger automobiles and coaches, and is thus good in versatility.

The invention claimed is:

1. An intelligent control method for headlights of an automobile, comprising:
    setting a low beam threshold of ambient light intensity a high beam threshold of ambient light intensity a tunnel entry threshold of rate of decrease of ambient light intensity and an automobile meeting threshold of rate of increase of ambient light intensity;
    detecting a current ambient light intensity at a first interval of time in an automatic control mode, and controlling a turning on or off of the high beam lights and low beam lights according to an on status or off status of the high beam lights and low beam lights, the current ambient light intensity, and the a current rate of increase or decrease of ambient light intensity;
    wherein the controlling comprises, while operating the automobile in the automatic control mode with both high beam lights and low beam lights off:
    if the current ambient light intensity is less than the low beam threshold, comparing a first current rate of decrease of ambient light intensity as measured under a condition that both the high beam lights and low beam lights are off with the tunnel entry threshold; and
    if the current rate of decrease is less than the tunnel entry threshold, activating a night traveling mode wherein the low beam lights are all on; and
    if the current rate of decrease is greater than the tunnel entry threshold, activating a tunnel traveling mode wherein the low beam lights are all on.

2. The intelligent control method for automobile headlights as set forth in claim 1, further comprising, while operating the automobile in the automatic control mode with the low beam lights on, detecting the current ambient light intensity at a second interval of time, and
    if the current ambient light intensity is not increasing, and the current ambient light intensity is less than the high beam threshold, turning the low beam lights off and turning the high beam lights on, and if the current ambient light intensity is not increasing and is not less than the high beam threshold, maintaining the low beam lights in the on status;
    if the current ambient light intensity is increasing, the tunnel traveling mode is not active, and either the current ambient light intensity is not larger than the low beam threshold, or the current ambient light intensity is larger than the low beam threshold and a first current rate of increase of ambient light intensity, measured under the condition that the low beam lights are on, is greater than the automobile meeting threshold, maintaining the low beam lights in an on status;
    if the current ambient light intensity is increasing, the tunnel traveling mode is not active, and the current ambient light intensity is larger than the low beam threshold, and the first current rate of increase of ambient light intensity is not larger than the automobile meeting threshold, turning the low beam lights off;
    if the tunnel traveling mode is active, detecting the current ambient light intensity again, and if the current ambient light intensity is decreasing, or the current ambient light intensity is not decreasing and the current ambient light intensity is not larger than the low beam threshold, maintaining the low beam lights in the on status; if the tunnel traveling mode is active, and the current ambient light intensity is not decreasing, and the current ambient light intensity is larger than the low beam threshold, turning the low beam lights off.

3. The intelligent control method for automobile headlights as set forth in claim 2, further comprising, while operating the automobile in the automatic control mode with the high beam lights on, detecting the current ambient light intensity at a third interval of time, and
- if the current ambient light intensity is increasing and a second rate of increase of the ambient light intensity, measured under the condition that the high beam lights are on, is larger than the automobile meeting threshold, or if the current ambient light intensity is increasing and the second rate of increase is not larger than the automobile meeting threshold and the current ambient light intensity is larger than the high beam threshold, turning the high beam lights off and turning the low beam lights on;
- if the current ambient light intensity is not increasing, or the current ambient light intensity is increasing and the second rate of increase is not larger than the automobile meeting threshold and the current ambient light intensity is not larger than the high beam threshold, maintaining the high beam lights in an on status.

4. The intelligent control method for automobile headlights as set forth in claim 3, further comprising, while operating the automobile in the automatic control mode with both the high beam lights and low beam lights off, detecting the current ambient light intensity at the first interval of time, and if the current ambient light intensity is less than the low beam threshold, comparing the first current rate of decrease with the tunnel entry threshold, and if the first current rate of decrease is less than the tunnel entry threshold, entering the night traveling mode, and if the first current rate of decrease is greater than the tunnel entry threshold, entering the tunnel traveling mode.

5. The intelligent control method for automobile headlights as set forth in claim 1, further comprising, while operating the automobile in the automatic control mode with the high beam lights on, detecting the current ambient light intensity at a third interval of time, and
- if the current ambient light intensity is increasing and a second rate of increase of the ambient light intensity, measured under the condition that the high beam lights are on, is larger than the automobile meeting threshold, or if the current ambient light intensity is increasing and the second rate of increase of the ambient light intensity is not larger than the automobile meeting threshold, and the current ambient light intensity is larger than the high beam threshold, turning the high beam lights off and turning the low beam lights on;
- if the current ambient light intensity is not increasing, or the current ambient light intensity is increasing and the second rate of increase is not larger than the automobile meeting threshold and the current ambient light intensity is not larger than the high beam threshold, maintaining the high beam lights in an on status.

6. The intelligent control method for automobile headlights as set forth in claim 1, further comprising, by a manual operator, judging whether the automobile is in the automatic control mode, and if not, performing manual operations.

7. The intelligent control method for automobile headlights as set forth in claim 1, comprising, when the low beam lights are turned on, turning outline marker lamps on.

8. An intelligent control system for automobile headlights, comprising a main controller, wherein the input of the main controller is connected to a signal acquisition circuit and the output thereof is connected to a drive output circuit, said signal acquisition circuit comprises a panel switching signal acquisition circuit and an ambient light intensity signal acquisition circuit, said drive output circuit comprises a control and drive circuit for low beam lights and high beam lights; and said main controller implements the control as follows so as to control the low beam lights and high beam lights:
- setting a low beam threshold of ambient light intensity a high beam threshold of ambient light intensity a tunnel entry threshold of rate of decrease of ambient light intensity and an automobile meeting threshold of rate of increase of ambient light intensity;
- detecting a the current ambient light intensity at a first interval of time in an automatic control mode, and controlling a turning on or off of the high beam lights and low beam lights according to an on status or off status of the high beam lights and low beam lights, the current ambient light intensity, and a current rate of increase or decrease of ambient light intensity;
- wherein the controlling comprises, while operating the automobile in the automatic control mode with both high beam lights and low beam lights off:
- if the current ambient light intensity is less than the low beam threshold, comparing a first current rate of decrease of ambient light intensity as measured under a condition that both the high beam lights and low beam lights are off with the tunnel entry threshold; and
- if the current rate of decrease is less than the tunnel entry threshold, activating a night traveling mode wherein the low beam lights are all on; and
- if the current rate of decrease is greater than the tunnel entry threshold, activating a tunnel traveling mode wherein the low beam lights are all on.

9. The intelligent control system for automobile headlights as set forth in claim 8, wherein the main controller also implements:
- while operating the automobile in the automatic control mode with the low beam lights on, detecting the current ambient light intensity at a second interval of time, and
- if the current ambient light intensity is not increasing, and the current ambient light intensity is less than the high beam threshold, turning the low beam lights off and turning the high beam lights on, and if if the current ambient light intensity is not increasing and is not less than the high beam threshold, maintaining the low beam lights in the on status;
- if the current ambient light intensity is increasing, judge whether the tunnel traveling mode is active, and if the tunnel traveling mode is not active and the current ambient light intensity is not larger than the low beam threshold, or if the current ambient light intensity is larger than the low beam threshold and a first current rate of increase of ambient light intensity, measured under the condition that the low beam lights are on, is greater than the automobile meeting threshold, maintaining the low beam lights in an on status; if the tunnel traveling mode is not active, and the current ambient light intensity is larger than the low beam threshold , and the first current rate of increase of ambient light intensity is not larger than the automobile meeting threshold, turning the low beam lights off;
- if the tunnel traveling mode is active, detecting the current ambient light intensity again, and if the current ambient light intensity is decreasing, or the current ambient light intensity is not decreasing and the current ambient light intensity is not larger than the low beam threshold, maintaining the low beam lights in the on status; if the current ambient light intensity is not decreasing and the current ambient light intensity is larger than the low beam threshold, turning the low beam lights off.

10. The intelligent control system for automobile headlights as set forth in claim 9, wherein said main controller also implements: while operating the automobile in the automatic control mode with the high beam lights on, detecting the current ambient light intensity at a third interval of time, and if the current ambient light intensity is increasing and a second rate of increase of the ambient light intensity, measured under the condition that the high beam lights are on, is larger than the automobile meeting threshold, or if the current ambient light intensity is increasing and the second rate of increase is not larger than the automobile meeting threshold and the current ambient light intensity is larger than the high beam threshold, turning the high beam lights off and turning the low beam lights on;

if the current ambient light intensity is not increasing, or the current ambient light intensity is increasing and the second rate of increase is not larger than the automobile meeting threshold and the current ambient light intensity is not larger than the high beam threshold, maintaining the high beam lights in an on status.

11. The intelligent control system for automobile headlights as set forth in claim 10, wherein said main controller also implements, while operating the automobile in the automatic control mode with both the high beam lights and low beam lights off, detecting the current ambient light intensity at the first interval of time, and if the current ambient light intensity is less than the low beam threshold, comparing the first current rate of decrease with the tunnel entry threshold, and if the first current rate of decrease is less than the tunnel entry threshold, entering the night traveling mode, and if the first current rate of decrease is greater than the tunnel entry threshold, entering the tunnel traveling mode.

12. The intelligent control system for automobile headlights as set forth in claim 8, said main controller also implements: while operating the automobile in the automatic control mode with the high beam lights on, detecting the current ambient light intensity at a third interval of time, and if the current ambient light intensity is increasing and a second rate of increase of the ambient light intensity, measured under the condition that the high beam lights are on, is larger than the automobile meeting threshold, or if the current ambient light intensity is increasing and the second rate of increase of the ambient light intensity is not larger than the automobile meeting threshold, and the current ambient light intensity is larger than the high beam threshold, turning the high beam lights off and turning the low beam lights on;

if the current ambient light intensity is not increasing, or the current ambient light intensity is increasing and the second rate of increase is not larger than the automobile meeting threshold and the current ambient light intensity is not larger than the high beam threshold, maintaining the high beam lights in an on status.

13. The intelligent control system for automobile headlights as set forth in claim 8, wherein said signal acquisition circuit is provided with a fault feed-back signal acquisition circuit, and said drive output circuit is provided with a fault signal output circuit.

14. The intelligent control system for automobile headlights as set forth in claim 13, wherein said fault feed-back signal acquisition circuit comprises two parts, one part is a filter circuit used for detecting whether voltage signals exist on positive ends of the high beam lights and low beam lights, the corresponding input ports of the main controller are connected to the positive ends of the high beam lights and low beam lights through the filter circuit; the other part is a voltage comparison circuit used for detecting whether current signals exist in circuits of the high beam lights and low beam lights, the main controller is connected to negative ends of the low beam lights and high beam lights through the corresponding input ports, respectively.

15. The intelligent control system for automobile headlights as set forth in claim 14, wherein the high beam lights and low beam lights are grouped as a right low beam light, a right high beam light, a left low beam light, and a left high beam light; the positive ends of the right low beam light and the left low beam light are short connected, and the positive ends of the right high beam light and the left high beam light are short connected.

16. The intelligent control system for automobile headlights as set forth in claim 15, wherein in said control and drive circuit for the low beam lights and high beam lights: the positive ends of the right low beam light and the left low beam light are connected to the driving power supply through a first contactor after being short connected, the positive ends of the right high beam light and the left high beam light are connected to the driving power supply through normally open contacts of a second contactor after being short connected, and the coil of the first contactor is connected to the driving power supply through the normally closed contacts of the second contactor; the coils of the first contactor and the second contactor are connected to ground through a manual/automatic changeover circuit.

17. The intelligent control system for automobile headlights as set forth in claim 16, wherein the coils of said first contactor and the second contactor are connected to the ground through a manual relay; the coils of said first contactor and the second contactor are connected to corresponding ground control circuits that are controlled by the main controller, respectively; the ground control circuits comprise ground relays respectively connected to the coils of said first contactor and the second contactor, and the transistors controlled by the main controller are provided in a serial connection in the coil loop of the ground relays.

* * * * *

UNITED STATES PATENT AND TRADEMARK OFFICE
CERTIFICATE OF CORRECTION

Page 1 of 1

PATENT NO. : 9,663,022 B2
APPLICATION NO. : 14/713429
DATED : May 30, 2017
INVENTOR(S) : Fei Li et al.

It is certified that error appears in the above-identified patent and that said Letters Patent is hereby corrected as shown below:

On the Title Page

Item (73), Assignee: "Zhengzhou Yutong Bus Co., Zhengshou (CN)" should read
Zhengzhou Yutong Bus Co., Zhengzhou (CN)

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*